(12) United States Patent
Lee et al.

(10) Patent No.: US 7,388,598 B2
(45) Date of Patent: Jun. 17, 2008

(54) 3D CAMERA SYSTEM AND METHOD

(75) Inventors: Charles C. Lee, Little Canada, MN (US); Bruce H. Koehler, Minneapolis, MN (US)

(73) Assignee: Image Ensemble, Inc., Little Canada, MN (US)

( * ) Notice: Subject to any disclaimer, the term of this patent is extended or adjusted under 35 U.S.C. 154(b) by 867 days.

(21) Appl. No.: 10/780,154

(22) Filed: Feb. 17, 2004

(65) Prior Publication Data
US 2004/0160512 A1 Aug. 19, 2004

Related U.S. Application Data

(60) Provisional application No. 60/447,661, filed on Feb. 14, 2003.

(51) Int. Cl.
*H04N 13/00* (2006.01)
*H04N 13/02* (2006.01)
*G03B 35/00* (2006.01)

(52) U.S. Cl. ............... 348/42; 348/47; 352/57
(58) Field of Classification Search ................ 348/43, 348/47, 53, 218.1, 239, 42, 50; 352/57
See application file for complete search history.

(56) References Cited

U.S. PATENT DOCUMENTS

| 4,418,993 | A | * | 12/1983 | Lipton | 352/57 |
| 4,559,555 | A | * | 12/1985 | Schoolman | 348/53 |
| 5,473,364 | A | * | 12/1995 | Burt | 348/47 |
| 6,326,995 | B1 | * | 12/2001 | Palm et al. | 348/47 |
| 6,750,904 | B1 | * | 6/2004 | Lambert | 348/218.1 |
| 2002/0026300 | A1 | | 2/2002 | Shimazaki | |
| 2005/0018058 | A1 | * | 1/2005 | Aliaga et al. | 348/239 |

FOREIGN PATENT DOCUMENTS

| GB | 2 259 823 A | 3/1993 |
| WO | WO 97/03416 | 1/1997 |

* cited by examiner

*Primary Examiner*—Gims S Philippe
(74) *Attorney, Agent, or Firm*—Patterson, Thuente, Skaar & Christensen, P.A.

(57) ABSTRACT

A 3D camera system and method for generating a 3D picture from real 3D input pictures. The system includes one or more cameras, a robotic or manually driven moving platform on which the camera or cameras are adjustably mounted. The system is moved on a fan-shaped grating sheet in a format, such as curved or linear format, to produce accurate trigger signals for camera exposure at precise intervals, i.e. pictures of an object are taken at predetermined locations at precise intervals. Alternatively, an optical encoder and programmable divider can be used to trigger the cameras at programmable precise intervals. Also, a stepper or servo motor that moves the camera platform can be used to move the cameras to precise locations.

33 Claims, 13 Drawing Sheets

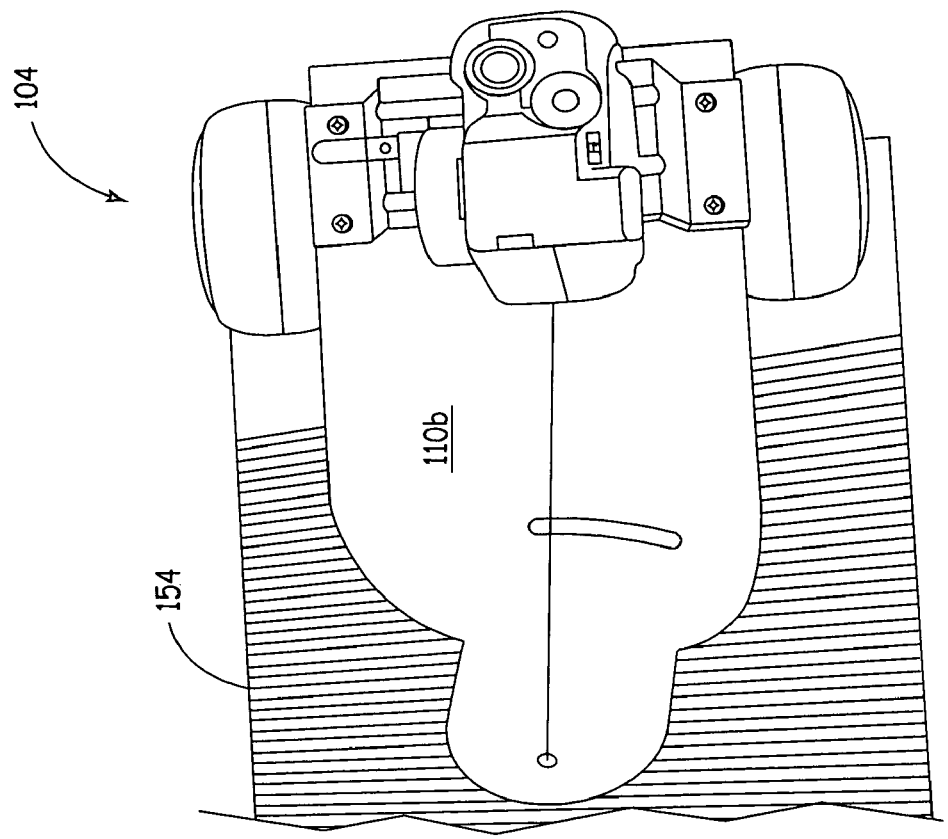
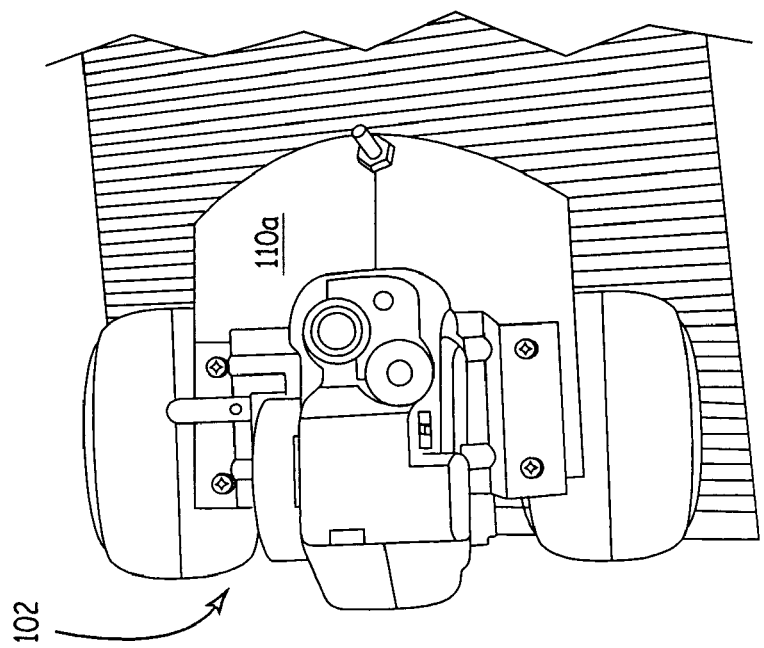
FIG. 12
FIG. 13

3D CAMERA SYSTEM AND METHOD

CROSS-REFERENCE TO RELATED APPLICATION(S)

The present utility patent application claims priority of U.S. Provisional Patent Application Ser. No. 60/447,661, filed Feb. 14, 2003, subject matter of which is incorporated herewith by reference.

FIELD OF THE INVENTION

The present invention is generally related to a system and method for constructing a 3D picture. More particularly, the present invention is related to a 3D camera system and method for generating a 3D picture from real 3D input pictures.

BACKGROUND OF THE INVENTION

In the past few years, the art of constructing 3D pictures, by using either a lenticular lens sheet or a barrier viewing screen, has made great progress. With the help of high speed computers, digital printing technology, good picture interlacing software, and the availability of low-cost 3D materials, the application of 3D graphics is widely used in advertising, photography and sign making to achieve attention-grabbing effects. A lenticular lens or a barrier viewing screen serves as a 3D viewing device. A lenticular lens or a barrier viewing screen is generally mounted on top of media printed with interlaced images.

Basically, there are three popular methods of generating interlaced images for a 3D picture construction. The first one is a moving camera method. For example, a still camera is moved along a guided slider at equal intervals while taking pictures. Then, the pictures of the sequential views are processed with a 3D software to provide an interlaced image. However, this method is only suitable for a non-moving subject.

The second method is referred to as a linear arrayed multi-camera method. This method is suitable for constructing a 3D picture of still or moving objects. A number of photographs are taken from different locations by using an array of multiple cameras. A variation of this system is a circularly arrayed multi-camera system, in which the cameras are arrayed circularly. However, the system is slow, bulky, heavy, and very expensive.

The third method uses a 3D software to convert or construct 2D images into layered images seeming to have good illusive depth effect. But this method cannot display a real, continuous and detailed 3D look for a portrait, a model etc.

Therefore, there is a need for a 3D camera system and method for generating a 3D picture with time efficiency, superior real 3D image quality, which is easy to use and cost-effective.

SUMMARY OF THE INVENTION

To solve the above and other problems, the present invention provides a 3D camera system and method for generating a 3D picture from real 3D input pictures. The system includes one or more cameras, and a robotic or manually driven moving platform on which the camera or cameras are adjustably mounted. The system is moved on a fan-shaped grating sheet in a format, such as curved or linear format, etc., to produce accurate trigger signals for camera exposure at precise intervals, i.e. pictures of an object are taken at predetermined locations at precise intervals. Alternatively, an optical encoder and programmable divider can be used to trigger the cameras at programmable precise intervals. Also, a stepper or servo motor that moves the camera platform can be used to move the cameras to precise locations.

In one embodiment of the present invention, the camera is a digital camera, and the system may further include an electric controller system, e.g. a stepping motor controller system, to move the digital cameras along a fan-shaped grating sheet in a curved or linear format. In this case, the stepper motor controller itself can replace the function of the grating sheet, to move the cameras to precise locations by controlling the number of step pulses between photos. The electric controller system can be operated remotely. Alternatively, the system may be arranged and configured without an electric controller system and is moved manually by a user along a fan-shaped grating sheet in a curved or linear format. The cameras in the system are triggered to take 3D pictures at precise intervals. The resulting digital picture files can be automatically downloaded into a computer for a 3D processing software to produce a final interlaced 3D image.

Further in one embodiment of the present invention, the robotic moving platform includes a set of wheels that are movable along a line on a fan-shaped grating sheet. The camera or cameras are mounted on the wheels wherein an optical axis of the camera or cameras, e.g. a laser pointer line, is centered over and parallel to the wheel axle. In the embodiment where two cameras are used, both cameras point to the center of rotation —the center of interest of an image target.

In one embodiment of the present invention, the system includes a stretchable linkage assembly between the wheels. The relative distance and/or angles of the cameras in the system can be readily adjustable so as to allow the perceived depth of a final stereogram to be controlled.

One of the advantages of the present invention is that the system and method is capable of generating a 3D image of an object based on a set of real 3D input pictures, without sacrificing image quality that is often caused by using conventional imaging processes, such as cropping, compression, blur elimination, edge sharpening, etc. The system is capable of focusing and maintaining a subject of the picture in the center of the view so as to avoid the waste of image area due to, e.g. cropping, etc., and also to bring all the image views in near perfect alignment in an interlacing process. This eliminates the step of cropping, etc., and manually aligning each image before processing them in the interlacing software.

Another advantage of the present invention in some embodiments is the simplicity of operation due to the capability of remote controlling and triggering of camera exposures.

In another aspect of the present invention, the system includes two cameras to provide a method of constructing a moving 3D object. At each point in a time sequence, the images from two cameras are captured simultaneously, representing multiple time sequenced left eye and right eye views. Each captured pair can be viewed by left eye and right eye simultaneously via a lenticular lens or barrier viewing screen. Accordingly, human eyes see the stereo-pair images at a proper point in time that results in 3D and animation in synchronization.

These and other features and advantages of the present invention will become apparent to those skilled in the art from the following detailed description, wherein it is shown and described illustrative embodiments of the invention, including best modes contemplated for carrying out the invention. As it will be realized, the invention is capable of modifications in various obvious aspects, all without departing from the spirit and scope of the present invention. Accordingly, the drawings and detailed description are to be regarded as illustrative in nature and not restrictive.

BRIEF DESCRIPTION OF THE DRAWINGS

FIGS. 12 and 13 are schematic views of the left part and the right part, respectively, of the fifth embodiment of the 3D camera system, in accordance with the principles of the present invention.

DETAILED DESCRIPTION OF THE PREFERRED EMBODIMENTS

The present invention provides a 3D camera system and method for generating a 3D picture from real 3D input pictures. The system includes one or more cameras, a robotic or manually driven moving platform on which the camera or cameras are adjustably mounted. The system is moved on a fan-shaped grating sheet in a format, such as curved or linear format, etc., to produce accurate trigger signals for camera exposure at precise intervals, i.e. pictures of an object are taken at predetermined locations at precise intervals. Alternatively, an optical encoder and programmable divider can be used to trigger the cameras at programmable precise intervals. Also, a stepper or servo motor that moves the camera platform can be used to move the cameras to precise locations.

Figure 1:
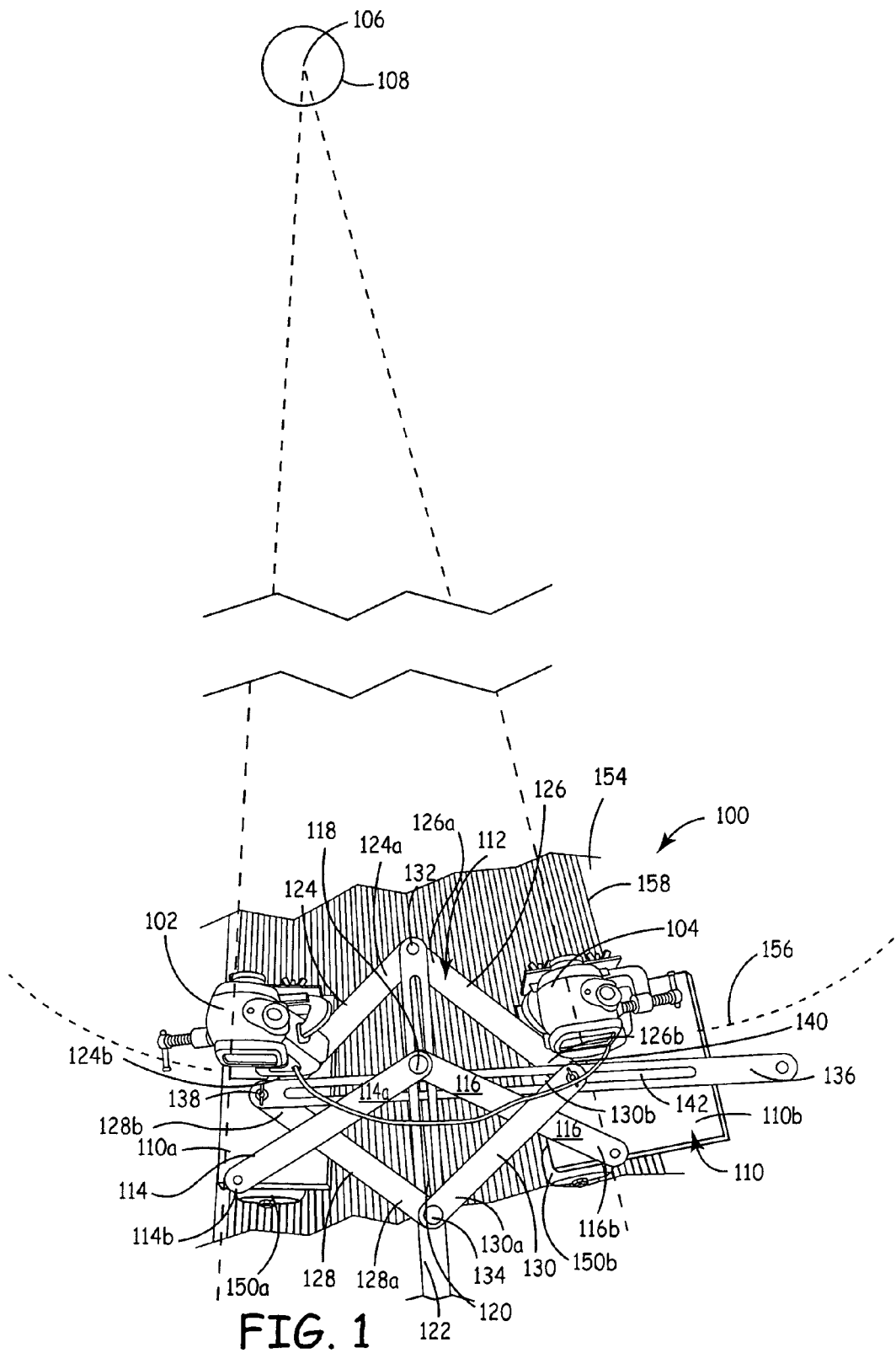
FIG. 1 is a schematic view of one embodiment of a 3D camera system having a set of two cameras pointing to a center of interest of an image object, in accordance with the principles of the present invention.

FIG. 1 illustrates a schematic view of one embodiment of a 3D camera system 100 having a set of two cameras 102, 104 pointing to a center of interest 106 of an object 108, in accordance with the principles of the present invention. The cameras 102, 104 are mounted on a robotic or manually driven moving platform 110. The platform 110 has two separable pieces 110a, 110b that carry cameras 102, 104, respectively. The platform pieces 110a, 110b are movable along a line 156 (see more details in FIG. 14) on their wheel assemblies 150a, 150b (see more details in FIGS. 7 and 8). The cameras 102, 104 are triggered to take pictures of the object 108 while moving along the line 156. The line 156 is generally perpendicular to lines 158 of a fan-shaped grating sheet 154 which will be discussed later in details.

In FIG. 1, the platform pieces 110a, 110b are joined by a stretchable linkage 112 such that the cameras 102, 104 can be adjusted at a desired position to ensure that an optical axis, e.g. a laser line, of both cameras 102, 104 focuses on or points to the same center of interest 106 of the object 108. Also, the stretchable linkage 112 allows the cameras 102, 104 to be adjusted at a desired position relative to each other to ensure that the cameras 102, 104 focus on or point to the same center of interest 106 of the object 108. One of the purposes of the stretchable linkage is to set the perceived depth of the final stereogram. Also, the stretchable linkage allows for smaller camera spacings for close by subjects and for larger camera spacings for far away subjects.

Figure 2:
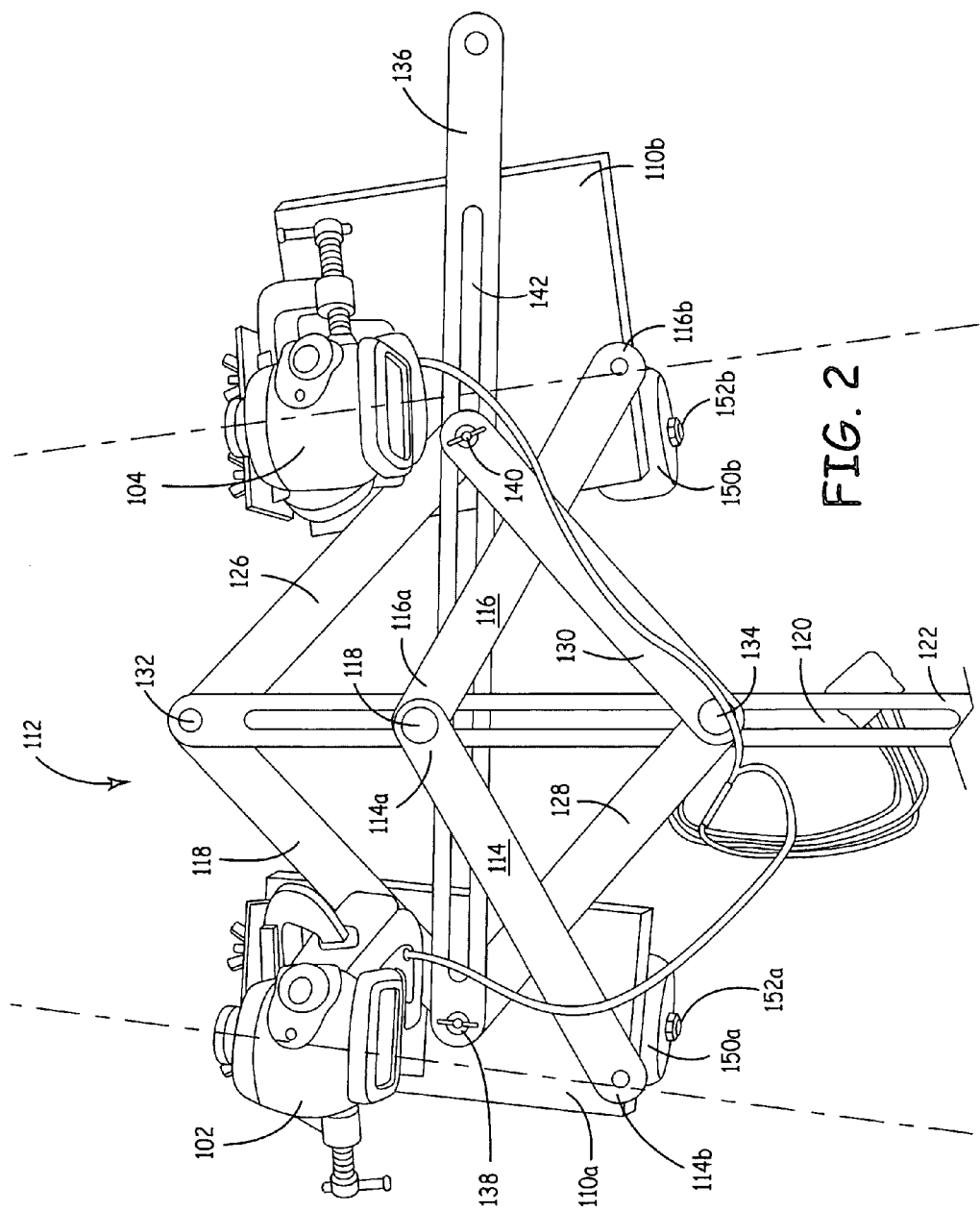
FIG. 2 is a schematic view of one embodiment of a 3D camera system of FIG. 1 showing a stretchable linkage capable of adjusting an angle between the cameras to point to a center of interest of an image object, in accordance with the principles of the present invention.

As shown in FIG. 1, the stretchable linkage 112 includes a first bar 114 and a second bar 116 linked by a connection 118 at one of their ends 114a, 116a. The ends 114a, 116a are detachably connected to each other at the connection 118 and slidable along a slot 120 of a linkage bar 122. The other ends 114b, 116b of the bars 114, 116 are fixedly mounted on the platform pieces 110a, 110b, respectively. Accordingly, the position of the cameras 102, 104, e.g. the angle of the cameras 102, 104, can be adjusted to ensure that the optical axes of the cameras 102, 104 focus on or point to the same center of interest 106 of the object 108. As illustrated in FIG. 2, the ends 114a, 116a of the bars 114, 116 are moved upwardly or downwardly whereby the optical angles of the cameras 102, 104 relative to the center of interest 106 of the object 108 are adjusted in equal amount in comparison to those shown in FIG. 1.

Figure 3:
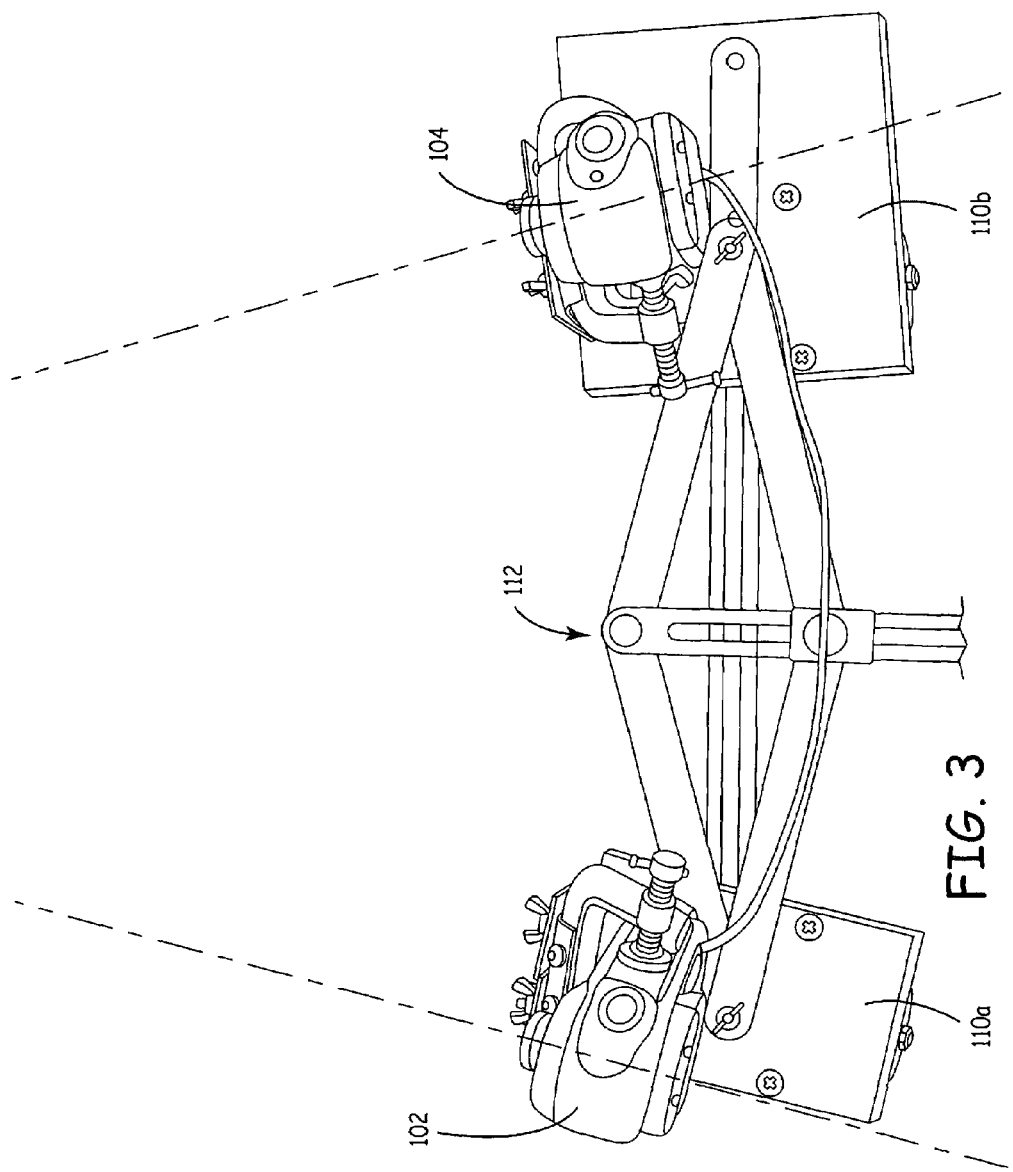
FIG. 3 is a schematic view of one embodiment of a 3D camera system of FIG. 1 showing a stretchable linkage capable of adjusting a distance between the cameras to point to a center of interest of an image object, in accordance with the principles of the present invention.

Also in FIG. 1, the stretchable linkage 112 includes a third bar 124, a fourth bar 126, a fifth bar 128, and a sixth bar 130. One of the ends 124a, 126a of the third and fourth bars 124, 126 are linked to the linkage bar 122 at a connection 132. The ends 128a, 130a of the fifth and sixth bars 128, 130 are linked to the linkage bar 122 at a connection 134. The ends 124b, 128b of the third and fifth bars 124, 128 are linked to a linkage bar 136 at a connection 138. The ends 124b, 128b, and the connection 138 are detachably mounted on the robotic moving platform piece 110a, and the ends 126b, 130b and the connection 140 are detachably mounted on the robotic moving platform piece 110b. The ends 126b, 130b of the fourth and sixth bars 126, 130 are linked to the linkage bar 136 at a connection 140. The ends 126b, 130b are detachably connected to each other at the connection 140 and slidable along a slot 142 of the linkage bar 136. Accordingly, a distance between the cameras 102, 104 can be adjusted. As illustrated in FIG. 3, the bars 124, 126, 128, and 130 are stretched outwardly or inwardly to ensure that the cameras are set at a desired distance, and by adjusting the bars 114 and 116 to ensure that the optical axes of the cameras 102, 104 focus on or point to the same center of interest 106 of the object 108.

Figure 4:
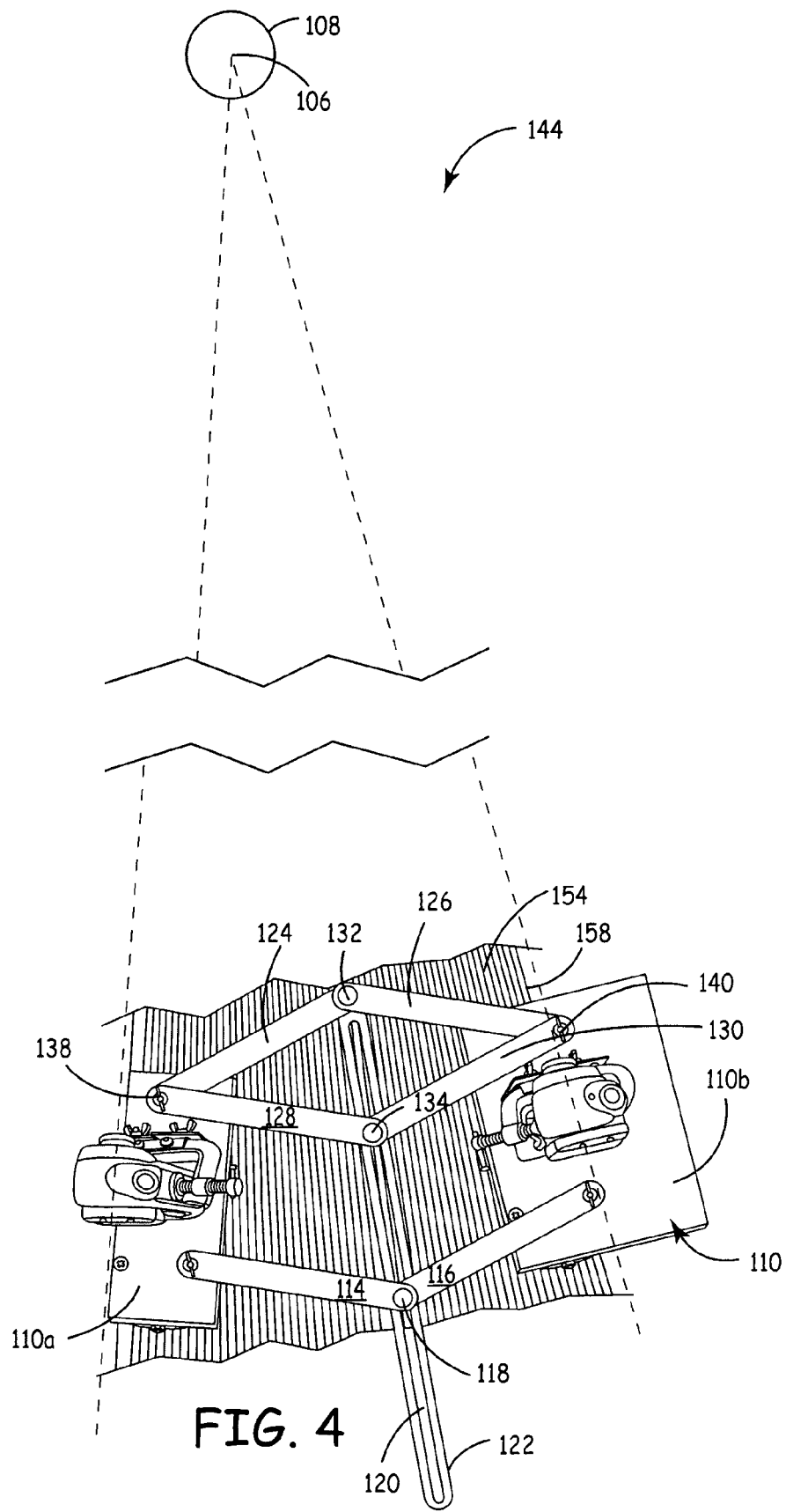
FIG. 4 is a schematic view of a second embodiment of a 3D camera system having a set of two cameras pointing to a center of interest of an image object, in accordance with the principles of the present invention.

FIG. 4 is a schematic view of a second embodiment of a 3D camera system 144. Similar to those shown in FIG. 3, the cameras 102, 104 are mounted on the platform pieces 110a and 110b, respectively. The optical axes of the cameras 102, 104 focus on or point to the same center of interest 106 of the object 108. In comparison to FIG. 1, the cameras 102, 104 are mounted approximately a middle section of the platform pieces 110a, 110b, respectively. The third, fourth, fifth, and sixth bars 124, 126, 128, 130 are linked in a similar fashion except that the connections 138 and 140 are mounted approximately a front section of the platform pieces 110a, 110b, respectively, and that the connection 134 between the bars 128, 130 is slidable along the linkage bar 122 to adjust the distance between the cameras 102, 104. The first and second linkage bars 114, 116 are linked in a similar fashion as those shown in FIG. 1 wherein the connection 118 is arranged such that the connection 118 can be slidable along the slot 120 of the linkage bar 122 to adjust the optical angles of the cameras 102, 104. It will be appreciated to a person skilled in the art that other types of suitable linkage systems can be used to adjust the position of the cameras within the scope and spirit of the present invention.

Figure 5:
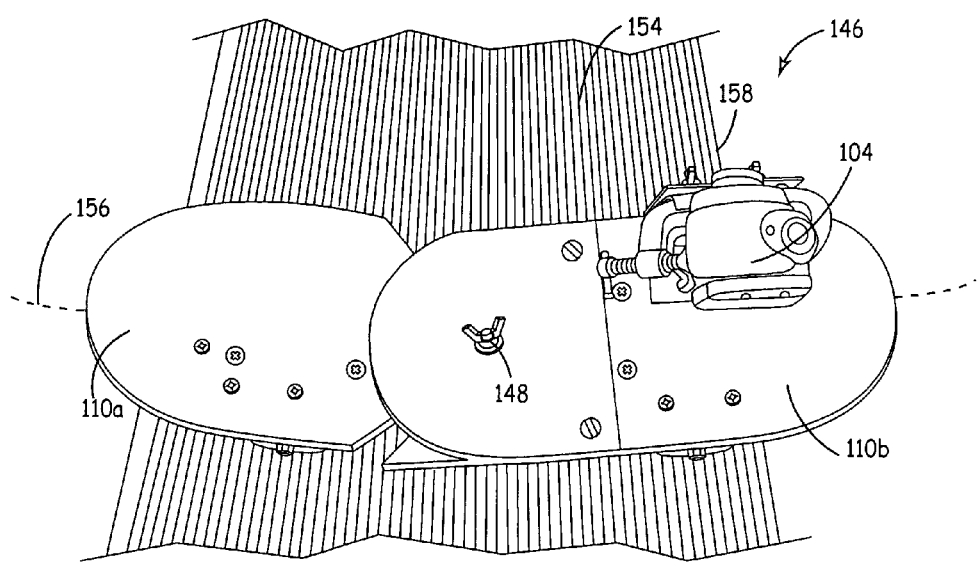
FIG. 5 is a schematic view of a third embodiment of a 3D camera system having one camera pointing to a center of interest of an image object, in accordance with the principles of the present invention.

FIGS. 5-9 illustrate different embodiments of a 3D camera system. For example, FIG. 5 illustrates a 3D camera system 146 having one camera to take pictures of an object. The camera is mounted in the same fashion as the camera 104 shown in FIGS. 1-4. The camera is mounted on the platform piece 110b and moved along the curve line 156 to take pictures of the object 108 in different positions. The other platform piece 110a can be detachably connected at a pivot point to the platform piece 10b via a connector, e.g. a bolt and a wing nut 148, such that the camera 104 can be adjusted to ensure that the optical axis of the camera 104 focuses on or points to the center of interest 106 of the object 108.

Figure 6:
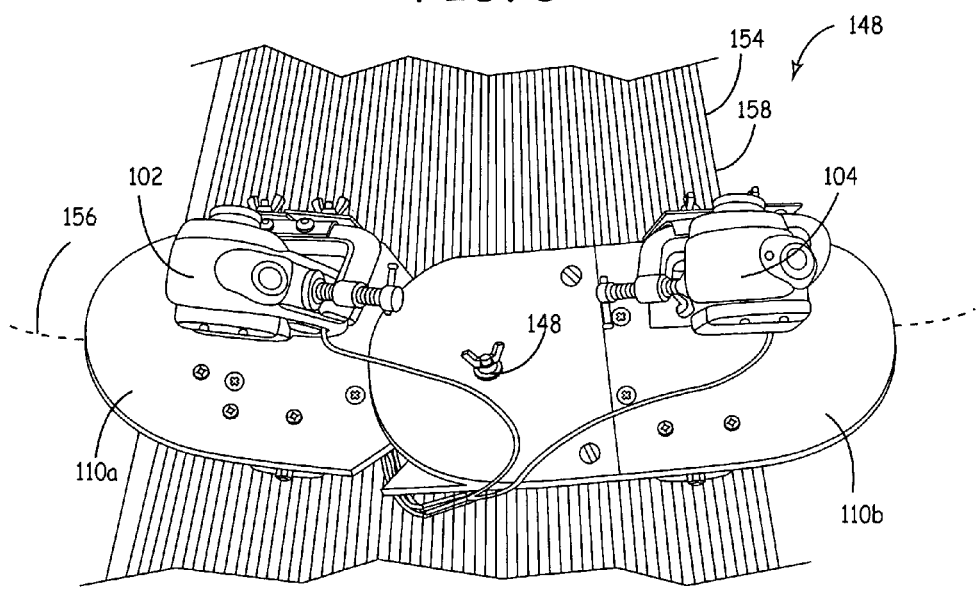
FIG. 6 is a schematic view of a fourth embodiment of a 3D camera system having a set of two cameras pointing to a center of interest of an image object, in accordance with the principles of the present invention.

FIG. 6 shows a 3D camera system 148 having both cameras 102, 104 mounted on the platform pieces 110a, 110b, respectively. As described in FIG. 5, the platform pieces 110a, 110b are detachably connected at a pivot point to each other via a connector, e.g. a bolt and a wing nut 148, such that the cameras 102, 104 can be adjusted to ensure that the optical axes of the cameras 102, 104 focus on or point to the same center of interest 106 of the object 108.

Figure 7:
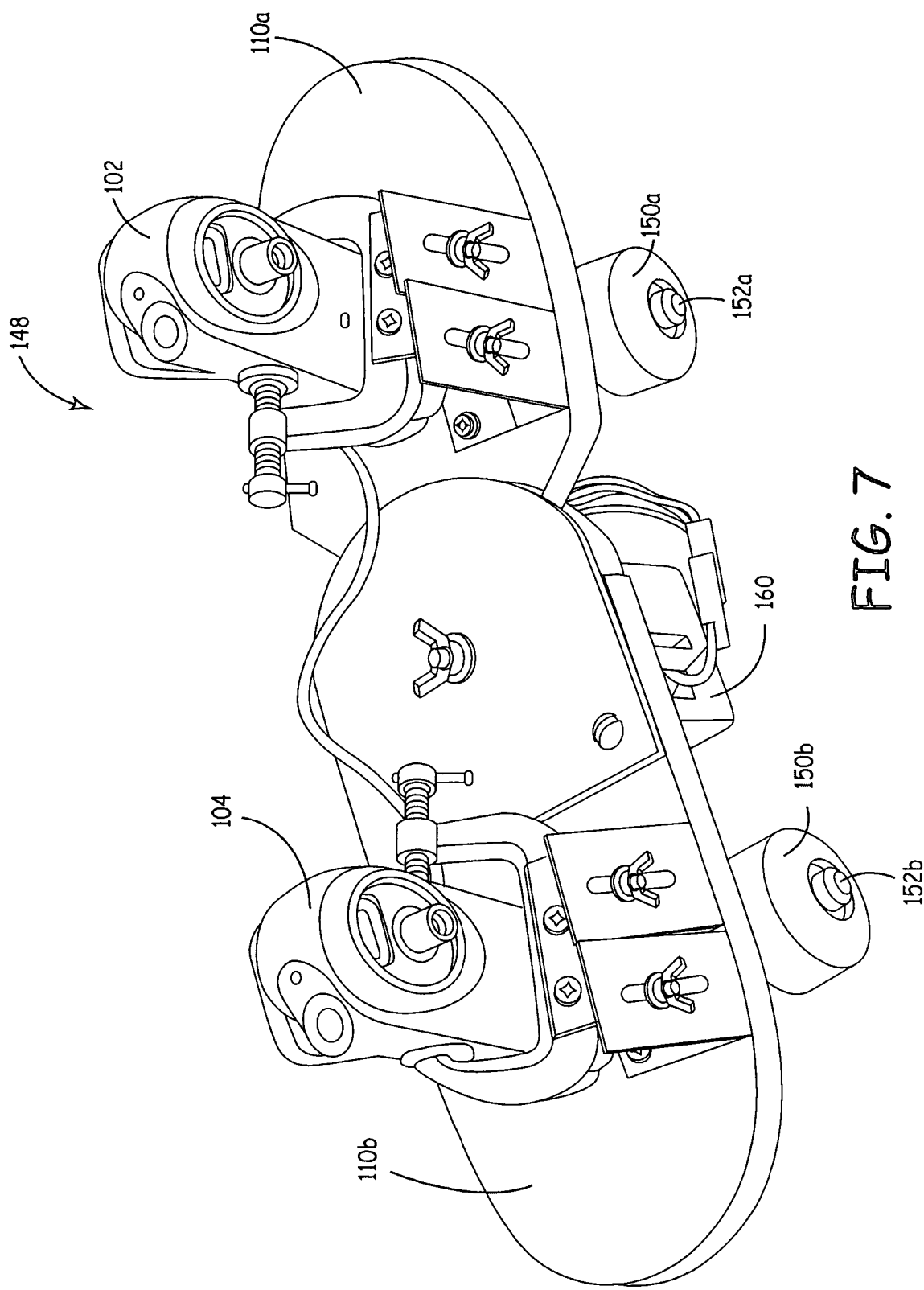
FIG. 7 is a top, front schematic view of the fourth embodiment of the 3D camera system shown in FIG. 6, in accordance with the principles of the present invention.
Figure 8:
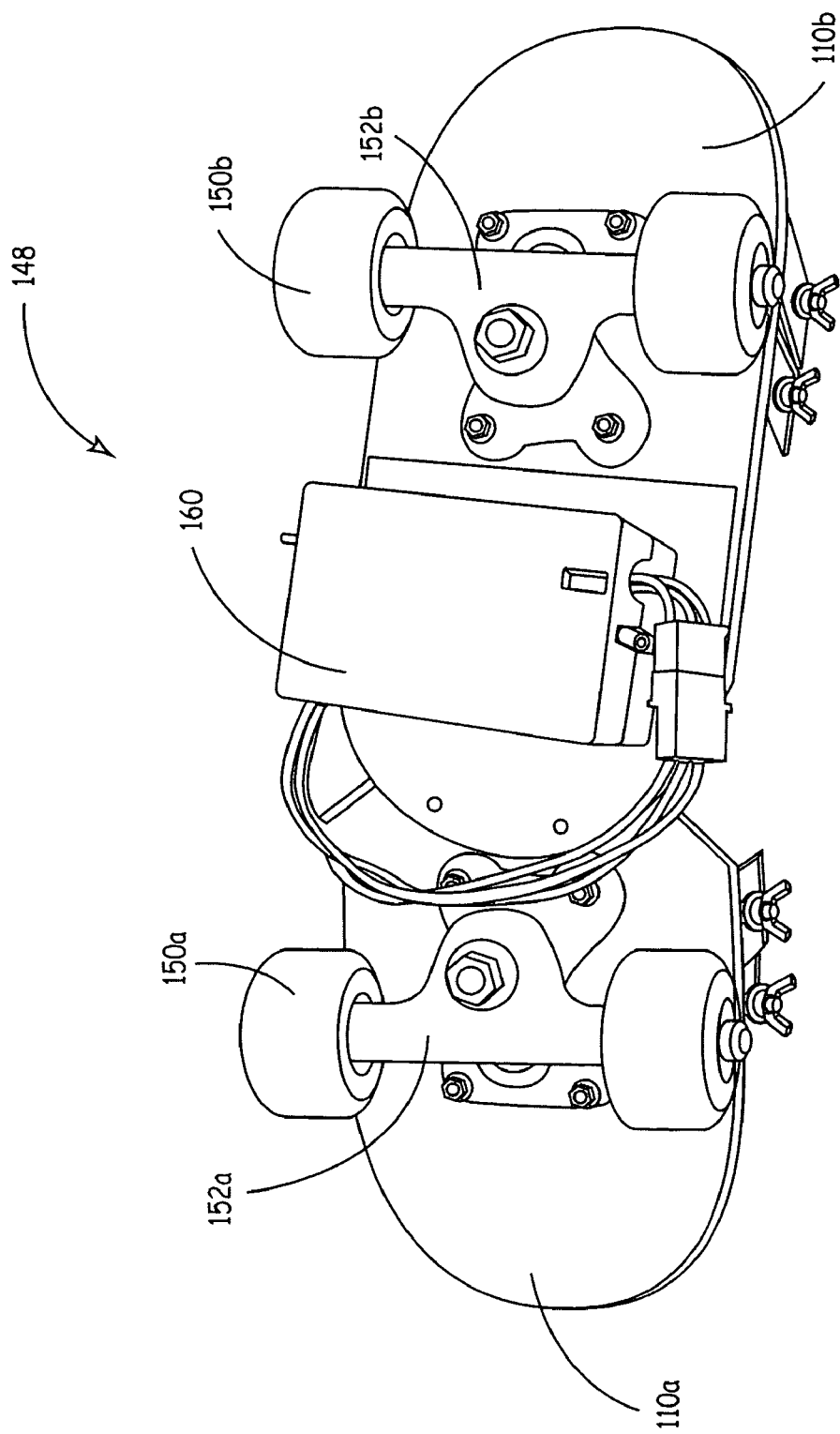
FIG. 8 is a bottom, front schematic view of the fourth embodiment of the 3D camera system shown in FIG. 6, in accordance with the principles of the present invention.
Figure 9:
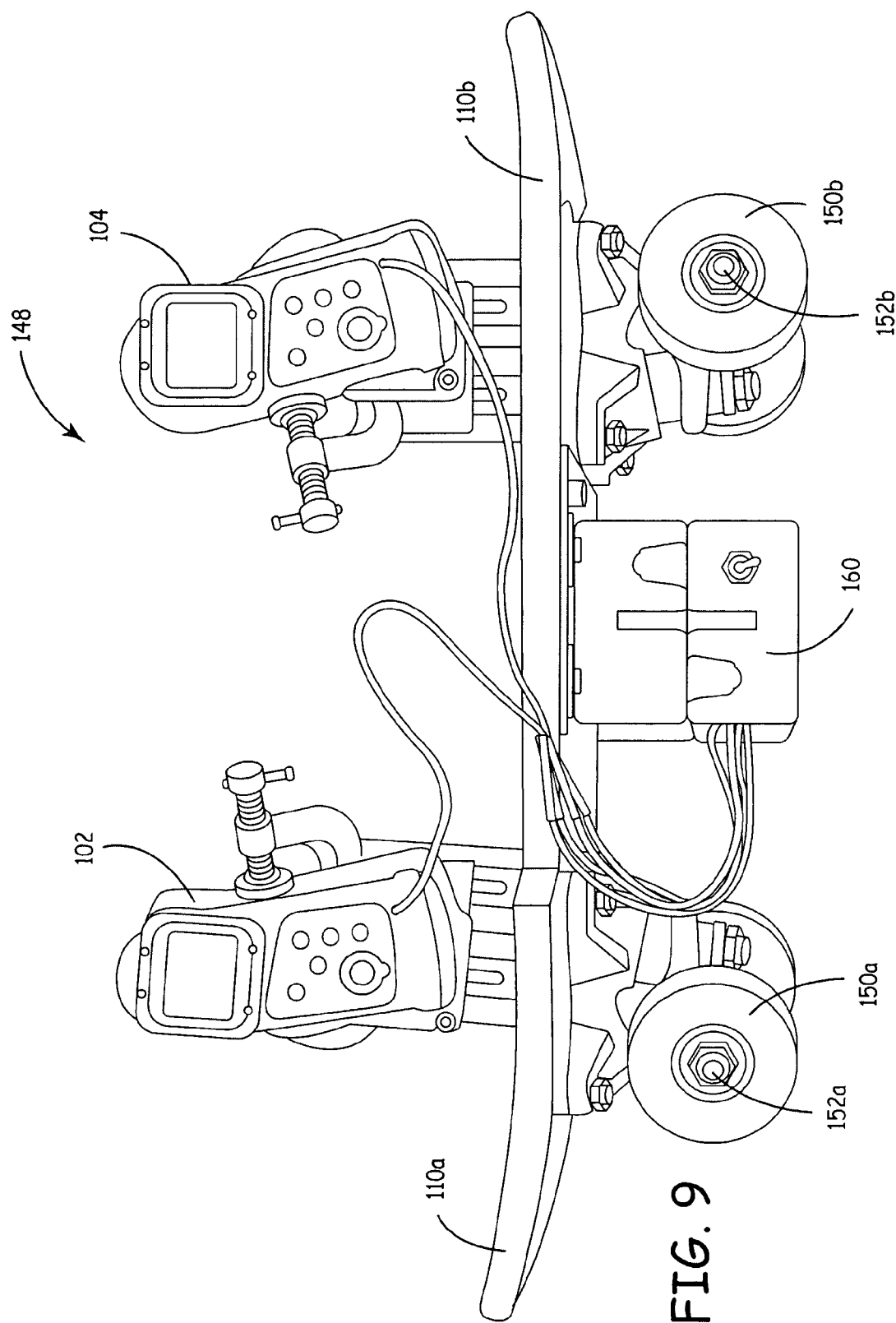
FIG. 9 is a front schematic view of the fourth embodiment of the 3D camera system shown in FIG. 6, in accordance with the principles of the present invention.

FIG. 7 shows a top, front schematic view of the 3D camera system 148 of FIG. 6. The platform pieces 110a, 110b are moved by wheel assemblies 150a, 150b. The optical axis of the camera 102 is parallel to and centered over a rotational axle 152a of the wheel assembly 150a. The optical axis of the camera 104 is parallel to and centered over a rotational axle 152b of the wheel assembly 150b. The wheel assemblies 150a, 150b are further illustrated in FIG. 8, a bottom view of the camera system, and in FIG. 9, a front view of the camera system.

Figure 14:
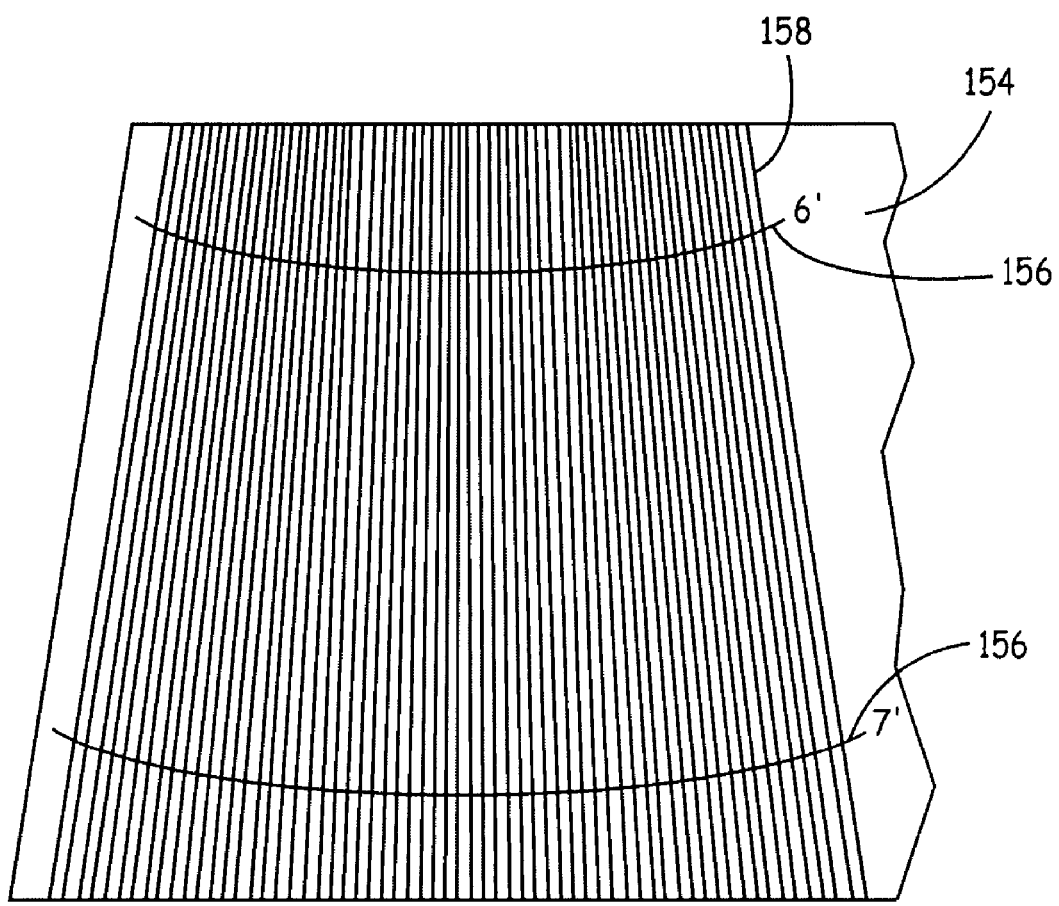
FIG. 14 is a schematic view of one embodiment of a fan-shaped grating sheet, in accordance with the principles of the present invention.

Also, as it will be appreciated, the object 108 may be located in different distances from the camera(s). Accordingly, the wheel assemblies 150a, 150b carrying the camera (s) are moved along different distance lines 156 on the fan-shaped grating sheet 154 as shown in FIG. 14 to take pictures of the object 108. For the purpose of illustration, exemplary distance lines 156 are shown in FIG. 14, whereby if the object 108 is six feet (6') away from the camera(s), the six-foot (6') line is used. If an object 108 is seven feet (7') away from the camera(s), the seven-foot (7') line is used. It will be appreciated that a series of fan-shaped grating sheet or mat corresponding to different object-to-camera distances, such as 3 ft, 4 ft, 5 ft, . . . 10 ft, . . . 20 ft . . . , can be fabricated for suitable occasions. The fan-shaped grating sheet or mat may be printed with black or dark ink, over a laminated sheet with a clear durable polycarbonate which has a textured surface to provide enough tracking for the wheel assemblies.

In one embodiment, a reading signal to trigger the cameras is provided by a reflective optoelectric detector comprising a light source and a photo detector having a working distance of, preferably, a few millimeters. The reflective optoelectric detector is mounted under the camera system a few millimeters above the fan-shaped grating sheet or mat. When the camera system travels along a path, a signal generated by the photo detector when a light beam crosses the edge of the black line controls the operation of the camera system and triggering of the cameras so as to take the pictures of the object accordingly. In one embodiment, a stepper motor is used to control the movement of the camera system. The signal generated by the photo detector may control the stepper motor to stop or to move and trigger the cameras to take pictures.

Alternatively, the movement of the camera system along the path is performed manually by a user, i.e. without a stepper motor. The signal generated by the photo detector may include a sound feedback whereby the camera system can be stopped manually by a user, such signal can also trigger the cameras to take pictures of an object.

Further, one can operate the cameras at a time lapsed mode and use each exposure signal from the camera after each picture taken to control the movement of the camera system for one interval distance. In a time lapsed mode, the cameras move along the line while taking pictures continuously. When a light level is high enough, the exposure can be very short and camera motion blurring can be reduced, which is a great way of shooting motion 3D pictures.

In one embodiment, the cameras are preferably digital cameras. Examples of the digital cameras may include the Canon Power Shot G2, G3, Canon Rebel Digital, Sony Cybershot line, etc. In one embodiment, the cameras can be directly connected to a PC. After each exposure, image data can be automatically sent to the PC for image processing, which saves time and simplifies the procedure.

As discussed above, the camera systems of different embodiments are operated to move along a curved line or path on a fan-shaped grating sheet. It will be appreciated that the camera systems can also be operated in many other formats, such as moving along a linear line or path, etc., without departing from the scope or spirit of the present invention.

Figure 11:
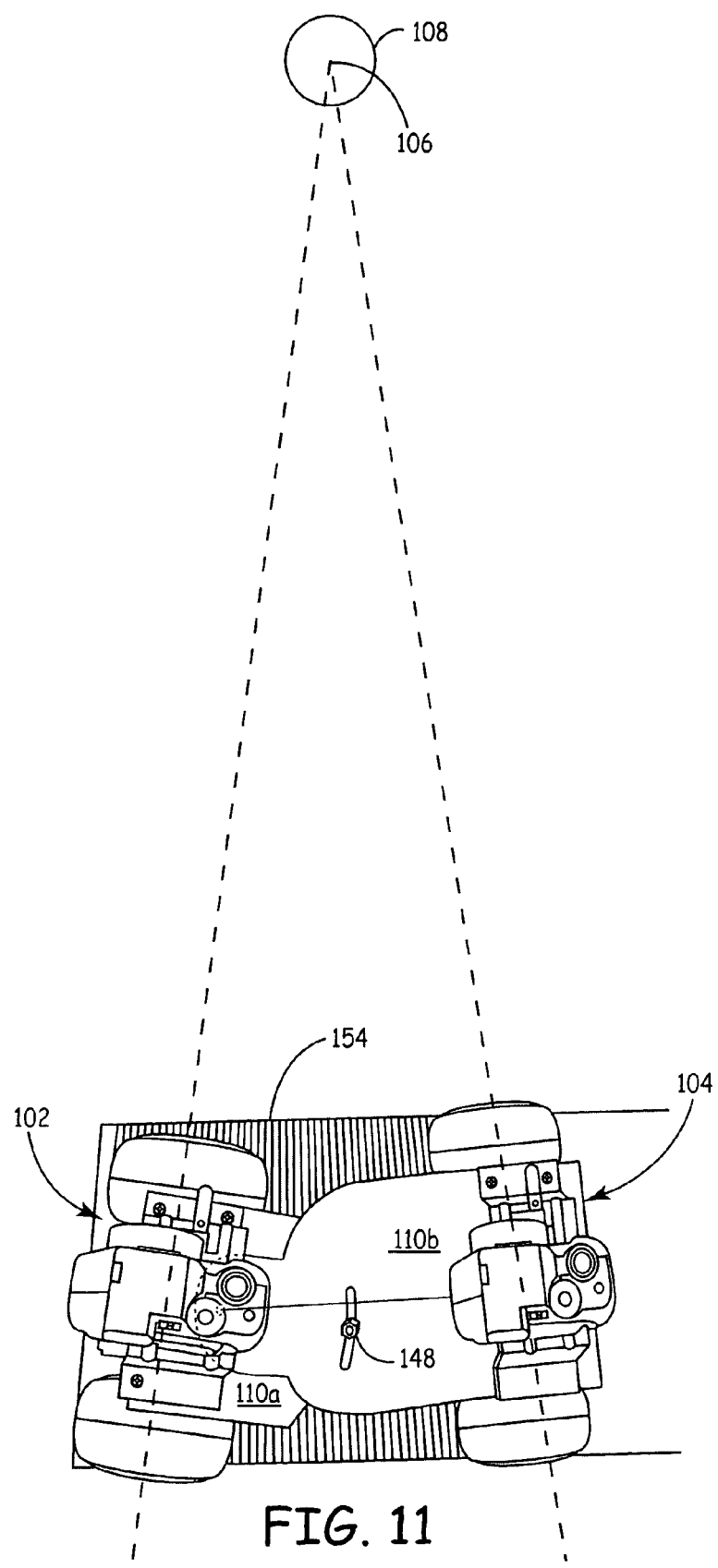
FIG. 11 is a schematic view of a fifth embodiment of a 3D camera system having a set of two cameras, mounted on a remote controlled platform, pointing to a center of interest of an image object, in accordance with the principles of the present invention.

FIGS. 11-13 illustrate another embodiment of a 3D camera system having two cameras mounted on a remote controlled platform, pointing to a center of interest of an object. The camera system can be driven in a remote, wireless fashion. The speed of the camera system can be controlled by a stepper motor to ensure that the speed is slow enough for the pictures to be taken, and that the camera systems can be paused and moved as desired.

The above illustrated camera systems can be assembled by mounting the camera(s) on a wheeled motion platform, placing the camera system on the desired distance radius line or path of a fan-shaped grating sheet, aligning the axle of the wheel with one of the fan lines which is perpendicular to the desired distance line of the fan-shaped grating sheet, adjusting camera(s) or its linkage to focus the optical axis of the camera on the center of interest of an object, locking the camera in position, and moving the camera system along the desired distance line of the fan-shaped grating sheet while taking pictures of the object. In one embodiment, one may aim a camera to the center of interest of an object by means of a laser pointer, and then aim the other camera to the same center of interest of the object by means of another laser pointer. The positions of the cameras can then be locked in place by tightening a connector, such as a wing nut.

The grating sheet 154 includes a plurality of fan-shaped grating lines separated with equal angle intervals. In one embodiment, the grating lines are black in color, and the distance of each interval is from, for example, greater than 0 to 1 inch, for taking sequential 3D pictures with the cameras. Each camera has a laser pointer attached as an aid to align the camera to the object. It will be appreciated that the grating lines can be in other suitable dark colors, and that a distance of each interval can be varied without departing from the scope of the present invention.

Figure 10:
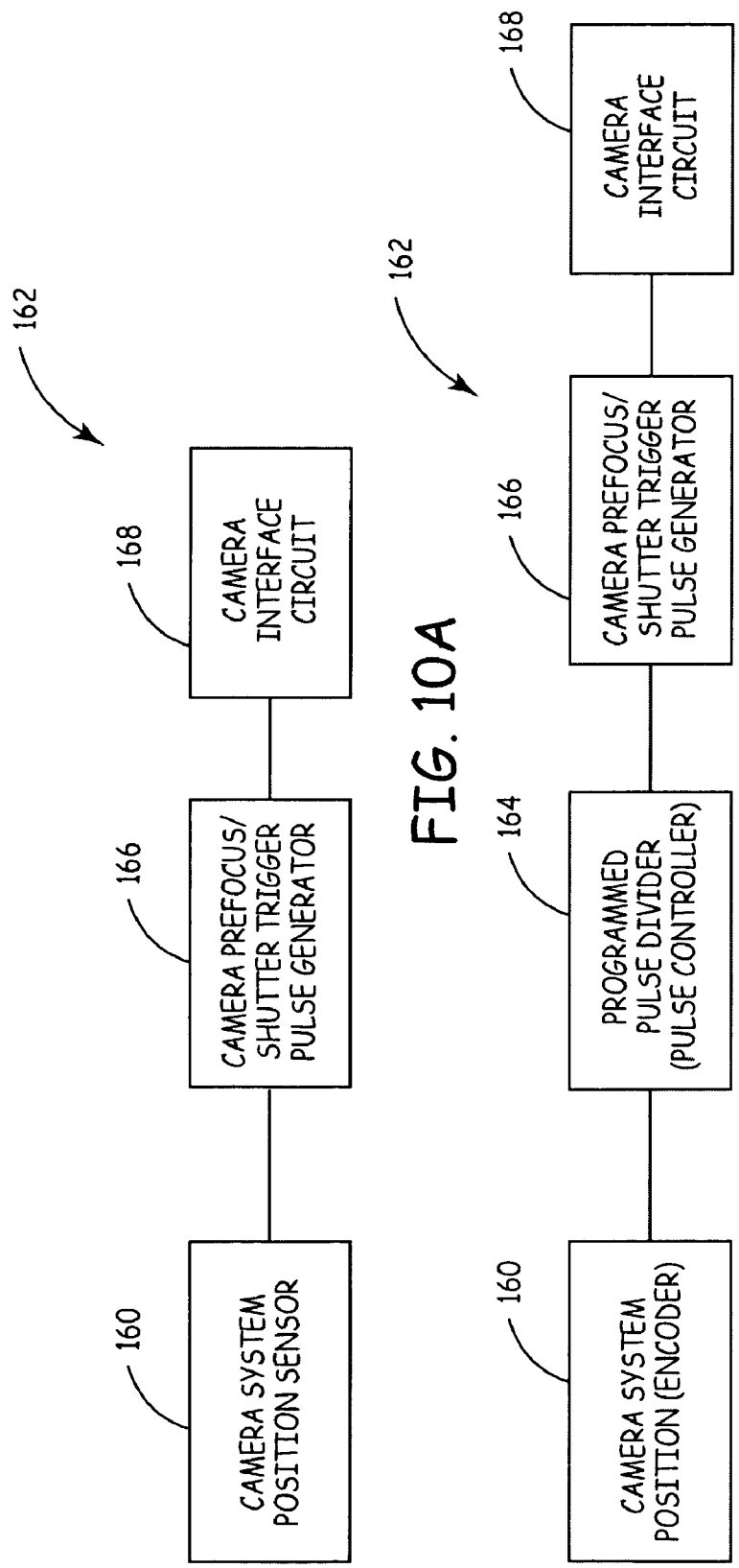
FIG. 10A is a block diagram of one embodiment of an optical camera trigger circuit, in accordance with the principles of the present invention.
FIG. 10B is a block diagram of another embodiment of an optical camera trigger circuit, in accordance with the principles of the present invention.

Also, one embodiment of the camera system in accordance with the principles of the present invention may include an optical camera trigger circuit 162 for controllably triggering the operation of the cameras, as illustrated in FIGS. 10A and 10B. The camera trigger circuit 162 may include a position sensor 160 such as a photo detector as described above, a rotary encoder, optical linear encoder, an optical or mechanical switch, etc., to detect where the pictures should be taken along the path of the moving cameras. A position sensor 160 can be mounted above the dark lines on a fan-shaped grating sheet, such as a photo detector as shown in FIG. 7, or can be installed on the wheel assembly where a number of positions are encoded per wheel revolution (not shown), etc. With a high resolution encoder as shown in FIG. 10B, a programmable divider 164 can be used to divide down the encoder pulse stream to get the desired position pulse spacing. With a simple optical or mechanical switch that detects black lines, bars or detents at the positions where a camera takes the pictures, no divider is necessary, as shown in FIG. 10A. Different patterns of lines, bars or detents at different spacing may be used. The selection of which pattern spacing to use would depend on the camera distance from the center of interest of the object, the number of pictures to be interlaced in a final stereogram, etc.

As shown in FIGS. 10A and 10B, after the position sensor 160 or position sensor/divider 160/164 is set up to generate the position pulses along a camera path, the camera trigger circuit 162 also includes a camera pre-focus/shutter trigger pulse generator 166 to trigger a camera shutter, and in some cases to trigger a camera pre-focus before triggering the camera shutter. The nature of these pulses is dependent on the particular camera being used, but generally if a camera pre-focus pulse is required, the pre-focus pulse starts, e.g. 0.5 to 2 seconds, before the shutter is triggered to give the camera time to focus. After the pre-focus duration, the shutter trigger pulse triggers the camera shutter, and during this time the pre-focus pulse continues for as long as the shutter trigger pulse is present. In many cases with digital cameras, a pre-focus pulse and a shutter trigger pulse can start at the same time and continue for the same duration. In this case, the camera usually takes as long as it needs to focus, then triggers the shutter when the focusing is finished. The only requirement in this case is that the pulses be longer than what is required to focus the camera. When triggering a stereo pair of cameras, this approach is often not acceptable because one camera may take longer to focus than the other, and the shutters will not trip at the same time. To avoid this, a dual pulse may be used, wherein one pulse is used to trigger pre-focus for as long as required for both cameras to focus, followed by a shutter trigger pulse which should then trigger both camera shutters at the same time.

In commercially available digital cameras, if an external connection to trigger the cameras is not available, the cameras may be opened to gain access to a focus/shutter switch. Typically, both switches have one terminal in common to ground. The other terminals need to be connected to ground to activate the function, either pre-focus or shutter. In one embodiment of the camera trigger circuit 162, this can be accomplished with a relay, or with open collector transistors so that the camera trigger circuit 162 and the cameras 102, 104 do not need to operate at the same voltage. If ground isolation is required between the camera trigger circuit 162 and the cameras 102, 104, transistor output optical isolators or relays can be used to trigger the camera pre-focus and shutter.

As further shown in FIGS. 10A and 10B, the camera pre-focus/shutter trigger pulse signals generated from the circuit 166 are then sent to a camera interface circuit 168 to control the operation of the cameras 102, 104.

In addition, the camera system in accordance with the principles of the present invention may include a camera stepper system for moving a camera or a stereo pair of cameras along a path, and for pausing and triggering the camera shutters at equally spaced positions along the path. The camera stepper system allows a photographer to set a step distance along the path, a number of pictures to take, and a time delay between taking the pictures. The result is a series of images or stereo pairs taken from multiple positions and at different points in time. The series of images can then be interlaced and constructed into a parallax or lenticular stereogram using parallax barrier line screens with an appropriate spacer, or with specially designed lenticular lens arrays.

Figure 15:
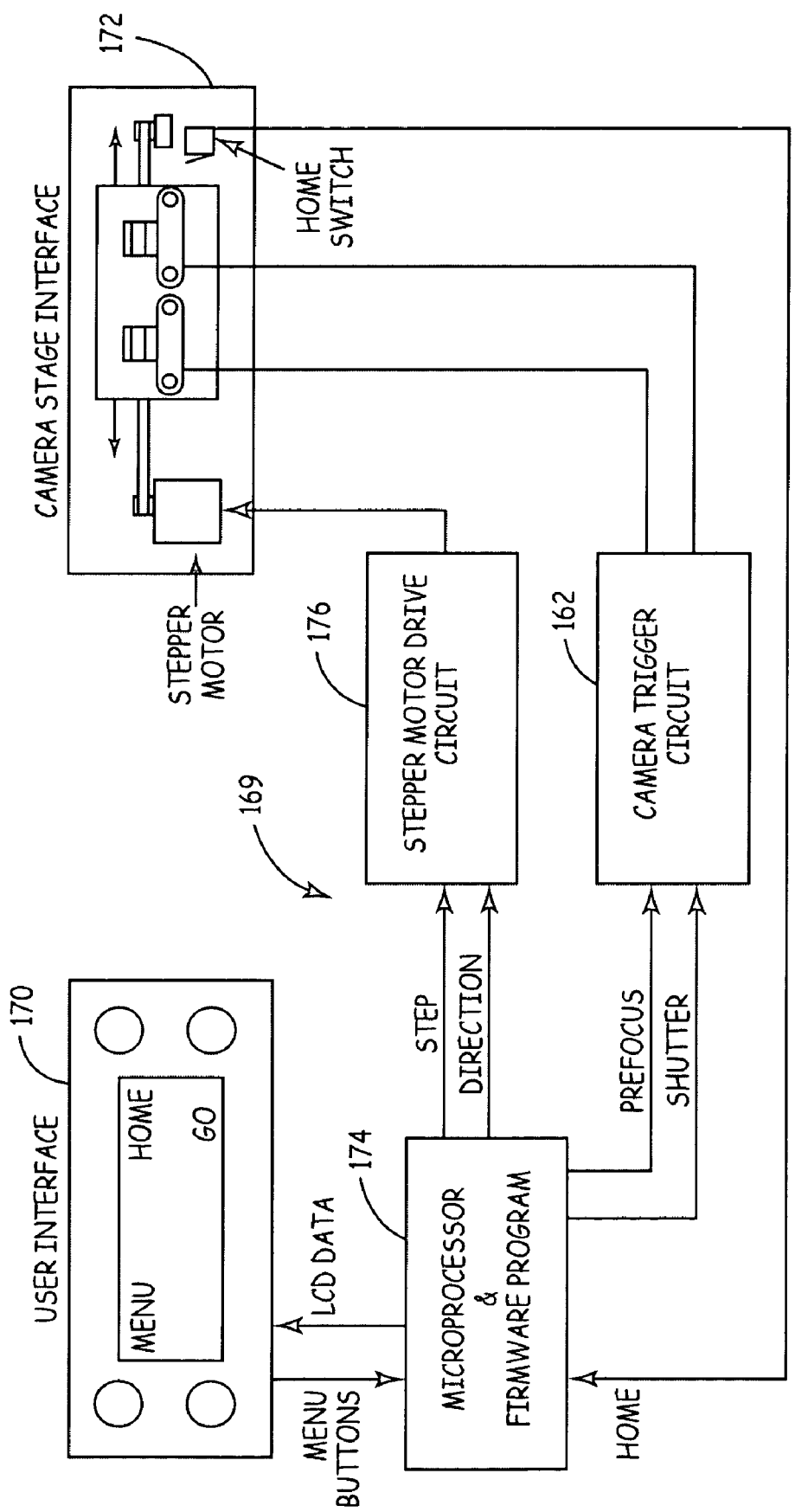
FIG. 15 is a block diagram of one embodiment of a camera stepper system of a 3D camera system, in accordance with the principles of the present invention.

FIG. 15 illustrates one embodiment of a camera stepper system 169 interfacing between a user interface 170 and a camera stage or interface 172. The camera stepper system 169 includes a microprocessor/firmware 174, a stepper motor drive circuit 176, and the camera trigger circuit 162. The components of the system shown in FIG. 15 are explained as follows:

User interface 170: The user interface may include a LCD display and menu buttons to allow setup of camera motion parameters. Camera start position, move increment, time increment, and number of photos to capture along the path are selected via the user interface. The user interface also allows the camera(s) to be reset for the photo sequence to be started or restarted.

Microprocessor/firmware 174: The microprocessor/firmware receives signals from menu pushbuttons and home sensor, delivers digital data to a LCD display, and provides step and direction signals to the stepper motor drive circuit 176. The microprocessor/firmware is programmed to perform different functions as selected via the user interface 170. The firmware program also handles the operation of the user interface 170.

Stepper motor drive circuit 176: The stepper motor drive circuit 176 receives the step, direction, and idle/run signals from the microprocessor/firmware 174. The circuit 176 drives the coils of a stepper motor in a sequence and polarity to move forward or backward with each step pulse. The circuit also controls a motor winding current to maximize torque when stepping and to minimize current draw when idle. The details of the stepper motor are not discussed herewith as they are not the subject of the present invention.

Camera trigger circuit 162: The camera trigger circuit includes switching transistors, relays, or opto-isolators used to interface the camera stepper system 169 to the camera pre-focus and shutter switches. For cameras without an electrical interface, the camera trigger circuit may include a solenoid or solenoids to mechanically actuate the camera shutter buttons. The camera trigger circuit triggers the camera shutters, and in some cases first triggers pre-focus (for auto-focus cameras) before triggering the camera shutters. When the photo taking sequence is started, the microprocessor 174 sends a camera pre-focus pulse to the camera trigger circuit 162 (causing autofocus cameras to focus), followed by a shutter trigger pulse that trips the shutters to capture the first photo(s) or picture(s). After a user has selected or preset time delay, the cameras are moved to the next position along the path and paused. Another pre-focus and shutter trigger pulse is sent to the cameras to capture the second photo(s) or picture(s) of the sequence. The cameras are moved and paused, and pulses are sent as many times as required to capture the number of photos or picture(s) as set by the user.

Camera stage or interface 172: The camera stage or interface includes a moving platform where the cameras are mounted, a stepper motor that moves the platform, and a home switch to initialize the stage or interface or to bring the cameras to a start position.

An exemplary use of the camera system in accordance with the principles of the present invention is: for a user who wants to capture a sequence of six stereo pairs using two cameras, and the cameras are spaced 3 inches apart. In this case, the cameras take six photos along a three-inch (3") path. Each camera move is ½ inch. Assume the cameras are digital wherein a prefocus and shutter electrical interface is available on the cameras, or the cameras have been custom-wired to allow activation of these functions by the shutter trigger circuit. In this example, assume the cameras take two seconds to recover after each photo, before they are ready for the next.

The user may set up the camera stepper system via the menu buttons and LCD display. In this case the following settings can be used:

Step increment: 0.5 inches (to take six photos along a three-inch path).
Number of photos: 6 (cameras will be stopped and triggered six times along the path).
Pause delay: 2.5 seconds (to allow time for the cameras to recover after each photo).
Pre-focus pulse: Yes (the camera may require a pre-focus pulse before the shutter is triggered)

Next, the user may select "Home" via the menu buttons to make the camera stage/interface move to its start position. The microprocessor sends a "backwards" direction signal to the stepper motor drive circuit, and a "step" pulse, thereby causing the camera platform to move one step, e.g. to the right. After the step pulse, the microprocessor checks the "home" sensor to see if the platform has reached the home position. If not, another step pulse is sent, and the home sensor is checked again. This continues until the home sensor indicates that the cameras have moved to their home or start position.

When the cameras are in their start positions, the user may select "Go" from the menu buttons. The microprocessor sends a pre-focus pulse to the camera trigger circuit, which causes the cameras to focus. After a short delay, the microprocessor sends a shutter trigger pulse to the camera trigger circuit, thereby causing the first stereo pair to be taken. After a 2.5 second delay, the cameras are moved 0.5 inches, e.g. to the left. The microprocessor sends a direction "forward" signal to the stepper motor drive circuit, followed by the number of step pulses required to move the cameras 0.5 inch (The number of steps required to move 0.5 inch is calculated by the microprocessor). Another pre-focus and shutter trigger signal is sent to trigger the second stereo pair to be taken. Another 2.5 second delay is started before the cameras are moved another 0.5 inches to the left, to the $3^{rd}$ position. This sequence continues until 6 stereo pairs have been taken. It will be appreciated that for some digital cameras, to set it at a "Manual Focus Mode", the process may speed up.

It will be appreciated that the above description is merely an example of operation or use of the camera system. The detailed specification and steps of the operation or use can be varied within the scope and spirit of the present invention.

One of the advantages of using time-sequenced stereo pairs to construct 3D parallax-barrier or lenticular stereograms with motion is that when a stereo pair of cameras are used to capture images from multiple positions and at different points in time, the resulting parallax barrier or lenticular stereogram constructed from those images is capable of displaying 3D and motion simultaneously. When the stereo pairs are taken with the proper camera spacings and step distances, and when the stereogram is constructed from the stereo pairs properly, the problem of motion blurring caused by each eye seeing an image taken at a different point in time can be eliminated. The motion effect from a time sequence of stereo pairs is superior to that of time sequence of single images, because a stereo pair is captured at each point in the time sequence. When viewing a stereogram properly made of stereo pairs captured at different points in time, each eye sees stereo pairs that were captured at the same time. The effect of motion is achieved by rotation of the stereogram, or walking by, or move head from side to side while viewing, presenting a time sequence of stereo pairs to the eyes. When a single camera is used to capture the photos along the path and at different points in time, the resulting stereogram shows the left and right eye images that were taken at different points in time. If the subject were stationary during the photo sequence, a good stereogram without motion would still be produced. However, if anything in the photo was moving during the photo sequence, a single-camera stereogram will show time differences between the left and right eye views for each stereo pair in the interlaced image. This results in a type of motion blurring, where each eye does not see the moving objects at the same point in time.

From the above description and drawings, it will be understood by those of ordinary skill in the art that the particular embodiments shown and described are for purposes of illustration only and are not intended to limit the scope of the present invention. Those of ordinary skill in the art will recognize that the present invention may be embodied in other specific forms without departing from its spirit or essential characteristics. References to details of particular embodiments are not intended to limit the scope of the invention.

What is claimed is:

1. A 3D camera system for generating a 3D image of an object from 3D input pictures of the object, comprising:
   at least one camera;
   a moving platform on which the at least one camera is adjustably mounted;
   a signal generator operable with the moving platform for generating a plurality of trigger signals for camera exposure to take the 3D input pictures of the object at predetermined locations at precise intervals wherein the signal generator comprises a photo detector mounted on the moving platform, and a fan-shaped grating sheet on which the moving platform is moved to produce the trigger signals for camera exposure to take the 3D input pictures of the object at the predetermined locations at the precise intervals; and
   an image processor for processing the 3D input pictures to generate the 3D image of the object.

2. The 3D camera system of claim 1, wherein the moving platform includes a set of wheels that are movable along a path on the fan-shaped grating sheet, wherein the path is generally perpendicular to a plurality of dark lines on the fan-shaped grating sheet, an axle of each wheel is parallel to one of the plurality of dark lines, and upon moving the photo detector along the path, the photo detector detects the dark lines so as to generate the plurality of trigger signals for triggering the camera to take the 3D input pictures of the object.

3. The 3D camera system of claim 2, wherein the camera is operated in a time lapsed mode, whereby the camera moves along the path while taking the 3D input pictures continuously.

4. The 3D camera system of claim 1, wherein the moving platform is moved manually by a user, wherein the signal generated by the photo detector includes a sound feedback whereby the camera system can be stopped manually by the user.

5. The 3D camera system of claim 1, wherein two cameras are mounted on two separable pieces of the moving platform, respectively, the two separable pieces of the moving platform being joined by a stretchable linkage, such that the two cameras can be adjusted at a desired position to ensure that an optical axis of each of the two cameras focuses on the same center of interest of the object.

6. The 3D camera system of claim 5, wherein the stretchable linkage is capable of adjusting an optical angle of the two cameras relative to the center of interest of the object.

7. The 3D camera system of claim 5, wherein the stretchable linkage is capable of adjusting a distance between the two cameras.

8. A 3D camera system for generating a 3D image of an object from 3D input pictures of the object, comprising:
   at least one camera;
   a moving platform on which the at least one camera is adjustably mounted;
   a signal generator operable with the moving platform for generating a plurality of trigger signals for camera exposure to take the 3D input pictures of the object at predetermined locations at precise intervals wherein the signal generator comprises an optical encoder and a programmable divider mounted on the moving platform, and upon moving the moving platform, to trigger the camera at programmable precise intervals; and
   an image processor for processing the 3D input pictures to generate the 3D image of the object.

9. The 3D camera system of claim 8, further comprising a stepper motor mounted on the moving platform to move the camera to the predetermined locations.

10. The 3D camera system of claim 9, wherein the moving platform includes a set of wheels, the optical encoder is mounted on one of the wheels, and upon moving the wheels, the encoder and programmable divider generate the plurality of trigger signals for triggering the camera to take the 3D input pictures of the object.

11. The 3D camera system of claim 9, wherein the moving platform includes a set of wheels, the optical encoder is mounted on one of the wheels, and upon moving the wheels, the encoder and divider generate the plurality of trigger signals for triggering the camera to take the 3D input pictures of the object and for controlling the stepper motor.

12. The 3D camera system of claim 8, wherein two cameras are mounted on two separable pieces of the moving platform, respectively, the two separable pieces of the moving platform being joined by a stretchable linkage, such that the two cameras can be adjusted at a desired position to ensure that an optical axis of each of the two cameras focuses on the same center of interest of the object.

13. The 3D camera system of claim 12, wherein the stretchable linkage is capable of adjusting an optical angle of the two cameras relative to the center of interest of the object.

14. The 3D camera system of claim 12, wherein the stretchable linkage is capable of adjusting a distance between the two cameras.

15. A system of constructing a 3D image of a moving 3D object, comprising:
   two cameras;
   a moving platform having two separable pieces on which the two cameras are adjustably mounted, respectively;
   a signal generator operable with the moving platform for generating a plurality of trigger signals for camera exposure to take 3D pictures of the moving 3D object at predetermined locations at precise intervals wherein the signal generator comprises a photo detector mounted on the moving platform, and a fan-shaped grating sheet on which the moving platform is moved to produce the trigger signals for camera exposure to take the 3D input pictures of the object at the predetermined locations at the precise intervals; and
   an image processor for processing the 3D pictures to generate the 3D image of the moving 3D object.

16. The system of claim 15, wherein at each point in a time sequence, the pictures taken from the two cameras are captured simultaneously, representing multiple time sequenced left eye and right eye views, whereby each captured pair can be viewed by left eye and right eye simultaneously via a lenticular lens/barrier viewing screen, so that human eyes can see stereo-pair images.

17. The system of claim 15, wherein the moving platform includes a set of wheels that are movable along a path on the fan-shaped grating sheet, wherein the path is generally perpendicular to a plurality of dark lines on the fan-shaped grating sheet, an axle of each wheel is parallel to one of the plurality of dark lines, and upon moving the photo detector along the path, the photo detector detects the dark lines so as to generate the plurality of trigger signals for triggering the cameras to take the 3D input pictures of the moving 3D object.

18. The system of claim 17, wherein the cameras are operated in a time lapsed mode, whereby the cameras move along the path while taking the 3D pictures continuously.

19. The system of claim 15, wherein the moving platform is moved manually by a user, wherein the signal generated by the photo detector includes a sound feedback whereby the camera system can be stopped manually by the user.

20. The system of claim 15, wherein the two separable pieces of the moving platform are joined by a stretchable linkage, such that the two cameras can be adjusted at a desired position to ensure that an optical axis of each of the two cameras is aligned parallel to and centered over the axle of the set of the wheels and focuses on the same center of interest of the moving 3D object.

21. The system of claim 20, wherein the stretchable linkage is capable of adjusting an optical angle of the two cameras relative to the center of interest of the moving 3D object.

22. The system of claim 20, wherein the stretchable linkage is capable of adjusting a distance between the two cameras.

23. A system of constructing a 3D image of a moving 3D object, comprising:
two cameras;
a moving platform having two separable pieces on which the two cameras are adjustably mounted, respectively;
a signal generator operable with the moving platform for generating a plurality of trigger signals for camera exposure to take 3D pictures of the moving 3D object at predetermined locations at precise intervals wherein the signal generator comprises an optical encoder and a programmable divider mounted on the moving platform, and upon moving the moving platform, to trigger the cameras at programmable precise intervals; and
an image processor for processing the 3D pictures to generate the 3D image of the moving 3D object.

24. The system of claim 23, further comprising a stepper motor mounted on the moving platform to move the cameras to the predetermined locations.

25. The system of claim 24, wherein the moving platform includes a set of wheels, the optical encoder is mounted on one of the wheels, and upon moving the wheels, the encoder and programmable divider generate the plurality of trigger signals for triggering the cameras to take the 3D input pictures of the moving 3D object.

26. The system of claim 24, wherein the moving platform includes a set of wheels, the optical encoder is mounted on one of the wheels, and upon moving the wheels, the plurality of trigger signals are generated for triggering the cameras to take the 3D pictures of the moving 3D object and for controlling the stepper motor.

27. The system of claim 23, wherein the two separable pieces of the moving platform are joined by a stretchable linkage, such that the two cameras can be adjusted at a desired position to ensure that an optical axis of each of the two cameras is aligned parallel to and centered over the axle of the set of the wheels and focuses on the same center of interest of the moving 3D object.

28. The system of claim 27, wherein the stretchable linkage is capable of adjusting an optical angle of the two cameras relative to the center of interest of the moving 3D object.

29. The system of claim 27, wherein the stretchable linkage is capable of adjusting a distance between the two cameras.

30. A signal generator for generating a plurality of trigger signals for camera exposure, comprising:
a photo detector; and
a fan-shaped grating sheet on which the photo detector is moved to produce the trigger signals for camera exposure to take 3D pictures of an object at predetermined locations at intervals;
wherein the photo detector is movable along a path on the fan-shaped grating sheet, wherein the path is generally perpendicular to a plurality of dark lines on the fan-shaped grating sheet, and upon moving the photo detector along the path, the photo detector detects the dark lines so as to generate the trigger signals for triggering a camera to take the 3D pictures of the object.

31. A fan-shaped grating sheet operable with a photo detector to generate a plurality of trigger signals for camera exposure of an object by a camera, comprising:
a plurality of fan-shaped dark grating lines, each line pointing to a common center point;
a plurality of distance lines generally perpendicular to the grating lines, each of the distance lines representing a distance from the object to the camera, wherein upon moving the photo detector along one of the distance lines, the photo detector detects the grating lines so as to generate the trigger signals for triggering the camera to take 3D pictures of the object.

32. A camera trigger circuit for controllably triggering operation of a moving camera of a 3D camera system which generates a 3D image of an object from 3D pictures of the object, comprising:
a position sensor for detecting positions where the 3D pictures of the object are taken along a path of the moving camera wherein the position sensor comprises a photo detector and a fan-shaped grating sheet on which the photo detector is move; and
a camera pre-focus/shutter trigger pulse generator for generating a pulse for pre-focusing the moving camera before triggering shutter of the moving camera.

33. The system of claim 23, wherein at each point in a time sequence, the pictures taken from the two cameras are captured simultaneously, representing multiple time sequenced left eye and right eye views, whereby each captured pair can be viewed by left eye and right eye simultaneously via a lenticular lens/barrier viewing screen, so that human eyes can see stereo-pair images.

* * * * *